Patented July 26, 1949

2,476,976

UNITED STATES PATENT OFFICE 2,476,976

PLASTICIZED CELLULOSE DERIVATIVE

Maximilien Grunfeld and Emile Clement Cottet, Lyon, France, assignors to Societe des Usines Chimiques Rhone-Poulenc, Paris, France No Drawing. Application October 22, 1945, Serial No. 623,895. In France January 24, 1941

Section 1, Public Law 690, August 8, 1946
Patent expires January 24, 1961

4 Claims. (Cl. 106—180)

This invention relates to methods of using adjuvants of technical organic substances and to products embodying these adjuvants with these substances.

An object of the invention is to plastify technical and synthetic organic substances, such as cellulose, cellulose derivatives, artificial and natural resins, polyvinyl compounds, polymerization products, condensation products, gums, gelatin, etc., by means of adjuvants, in order to produce compositions having superior qualities in the ultimate forms of films, pellicles, varnishes, sizings, coatings, adhesives, sheets, threads, sticks, tubing, moldings, and products of other useful forms and adaptations.

A particular object of the invention is the production of compositions which in their ultimate utilized forms are characterizable by new or improved qualities of transparency, elasticity, flexibility, tenacity, pliability, durability, adaptability, brilliance, smoothness, resistance, coating-capacity, insensitiveness to exterior conditions, etc., as the case may be.

A further object of the invention is to provide improved plastified compositions by the incorporation of the adjuvants herein disclosed either alone or with already known adjuvants, such as sulfoamides, triaryl-phosphates, pigments, and any of the ordinary adjuvants or auxiliaries known in the art.

Another object of the invention is to provide improved plastified compositions which may be tinted or pigmented, or supplemented, with dyestuffs, lampblack, titanium oxide, resins, etc., in any desirable proportions and in manners obvious to the art.

It has been found, and this finding concerns the present invention, that pentanetriol-1-2-5 and its partly or wholly esterified products, owing to their remarkable compatibility with most of the natural and synthetic organic compounds of the types that are capable of being plasticized, are excellent adjuvants of these compounds.

Pentanetriol-1-2-5 can be conveniently prepared by hydrolytic scission of the nucleus of tetrahydrofurfuryl alcohol, which is obtainable by hydrogenation of furfural, an abundant and readily available raw material. Pentanetriol-1-2-5 may also be prepared by saponification of a pentanetriol ester, or by any other process employed for the production of poly-alcohols.

Wholly esterified pentanetriol-1-2-5 is obtained either by esterification of the pentanetriol by well known methods, or by boiling tetrahydrofurfuryl alcohol or one of its partial esters with an anhydride (acetic, for instance) in the presence of suitable catalysts.

The partial esters of pentanetriol-1-2-5 are obtained either by partial esterification of the pentanetriol, or by partial saponification of a tri-ester according to known methods.

In a general way, the embodiment of pentanetriol-1-2-5 or its esters with organic plastifiable substances, results in an improvement of their plastic properties and their pliancy. For each organic substance it is easy to determine, from the list of adjuvants recommended according to the present invention, the compound and proportion desirable in order to attain the adaptation providing the desired property.

Thus, pentanetriol-1-2-5 itself is a suitable plasticizer for materials such as regenerated cellulose, cellulose ethers, polyvinyl alcohol, gum arabic, gelatin, etc. The esters of pentanetriol-1-2-5 can be used advantageously as plasticizers of most diverse plastic substances, such as cellulose derivatives, artificial resins, condensation products, polymerization products, and natural resins.

However, this enumeration is not exclusive, because the possibilities of embodying pentanetriol-1-2-5 and its partly or wholly esterified products do not involve any specificity with respect to any category in which the technical organic substances may be put. Besides, the search for the best properties, such as stability in the cold rather than the optimum plastic properties, may lead to distinctive results through the selection of one of the suggested adjuvants.

The plastification may in some cases be brought about by directly associating the adjuvant and the plastifiable material, or in other cases by incorporating the intended constituents of the desired composition with the aid of appropriate solvents among which the following are found useful according to the particular case: water, aqueous alcohol, denatured alcohol, ethyl alcohol, acetone, benzene, toluene, cyclopentanone, isophorone, butyl acetate, butyl alcohol, ethyl acetate, ethyl lactate, methylene chloride, and similar solvents.

The following examples are presented by way of illustration and are not restrictive in any way of the numerous applications which are made possible by the present invention. The parts are understood to be by weight.

*Example I*

200 parts of polyvinyl alcohol of high viscosity are dissolved by agitation in 800 parts of water, 60 parts of pentanetriol-1-2-5 are added to the solution, and the collodion is run on a plate and allowed to spread. The film obtained after drying is characterized by a remarkable transparency, and it has physical properties, especially an elasticity, which are greatly superior to those of films obtained with ordinary plasticizers.

Example II 60 parts of methyl-cellulose ($OCH_3$ content: 15 percent) are dissolved in 940 parts of water. 18 parts of pentanetriol-1-2-5 are added to the solution, and the latter is run on a plate, as before indicated. The film obtained is quite transparent and has good elasticity, and, from these two considerations, it is superior to unplasticized films or those plasticized otherwise. It is especially characterized by being protractable to a high degree before rupturing.

If the plasticized solution, instead of being run on a plate, is thinned with about eight volumes of water and a net fabric is treated with the resulting mixture, a sizing results which is remarkably flexible and tenacious, and in these respects is superior to ordinary sizings.

Example III 300 parts of an interpolyamide, obtained by copolymerization of 60 parts of adipic hexamethylenediamine and 40 parts of ε-aminocaproic acid, are dissolved by warming in 80 percent aqueous alcohol. To the solution are added 75 parts of pentanetriol-1-2-5. The warm solution is run on a surface heated to 70° C., where, after being run, it is stoved at 80° C. Upon drying, a transparent film is obtained which in elasticity and pliability is much superior to a film not so plasticized.

The plasticized solution can also be pigmented with dyes and appropriate substances (lampblack, "Zapon" dyestuffs, titanium oxide, etc.) and afterwards applied by a gumming machine, by a scraper, or by other known means, upon a previously smoothed fabric. A coated fabric of the moleskin type is obtained which, from the standpoint of resistance to wear and tear, is appreciably superior to similar products having coatings of linseed oil or cellulose derivatives.

Example IV

A thin sheet of cellulose regenerated from viscose is passed through a 50 percent pentanetriol solution. After dripping and drying, the resulting sheet, containing about 20 percent of pentanetriol, is very pliable and resistant and quite transparent.

Example V 100 parts of a 30 percent alcoholic solution of "Rhodopas HH" (a brand of polyvinyl acetate of high viscosity) are added to 6 parts of pentanetriol-1-2-5. After this solution has been run upon a smooth surface, a bright, transparent, and decidedly pliable film is obtained, in which is found a considerable diminution of sensitiveness to cold as compared to analogous unplasticized substances, or substances plasticized with ordinary materials.

Example VI 250 parts of "Rhodopas HH" (a polyvinyl acetate of high viscosity) are dissolved in a mixture of 600 parts of 95 percent denatured alcohol and 150 parts of ethyl lactate. To this solution are added 50 parts of triacetate of pentanetriol-1-2-5. The varnish thus obtained can be applied on practically any surface, and it imparts thereto a transparent, smooth and lustrous coating of very good pliancy. Soluble dyes, pigments and resins may also be added to the varnish.

Example VII

The following are worked up at about 70° C.: 20 parts of "Rhovinal F" polyvinyl formal), 10 parts of triacetate of pentanetriol-1-2-5, and 70 parts of 80 percent alcohol. The composition is rolled while warm, for the removal of the solvent. The plasticized formal thus obtained is converted, according to the known celluloid technique, into transparent and flexible plastic sheets, which retain their pliancy even at very low temperatures.

By substituting tripropionate of pentanetriol-1-2-5 for the triacetate of this example, similar results are obtained.

Example VIII

The following are worked up: 20 parts of "Rhovinal F" "polyvinyl formal), 7 parts of triacetate of pentanetriol-1-2-5, 3 parts of "celludol" (toluene-sulfonamide), 2 parts of lampblack, and 68 parts of solvent. The resulting mass, after rolling, can be converted by pressing at about 130° C. into sticks, tubing, moldings, etc. It can also be used for covering cables or for the manufacture of plastic articles cast in moulds.

Example IX 100 parts of cellulose acetate, containing about 54 percent of acetic acid, are worked up with 500 parts of acetone containing 33 parts of triacetate of pentanetriol-1-2-5. A bright and limpid solution is obtained which, after evaporation, affords a homogeneous film which is transparent and pliant.

Example X

The following are intermixed at 50° C.: 50 parts of cellulose acetate soluble in acetone, 15 parts of triacetate of pentanetriol-1-2-5, and 40 parts of a mixture consisting of equal parts by weight of ethyl alcohol and benzene. When the paste has become homogeneous it is subjected to processings known in the manufacture of plastic materials, such as rolling, baking under pressure, and cutting. Transparent sheets are obtained, and their color is unchanged by light.

In addition to triacetate of pentanetriol-1-2-5, triaryl-phosphates, sulfonamides, pigments, and any of the ordinary adjuvants known in the art of these plastic materials may be added as required or desired.

Example XI 20 parts of cellulose triacetate are dissolved in 70 parts of methylene chloride containing 10 percent of alcohol. To this mixture are added 10 parts of triacetate of pentanetriol-1-2-5 while agitating. When the mixture is homogeneous, the resulting solution is filtered and run upon a level surface. After evaporation, a pliant and water-resistant film is obtained which can be folded a considerable number of times without impairment.

Example XII 15 parts of nitro-cellulose are dissolved in a mixture of 20 parts of butyl acetate, 5 parts of butyl alcohol, 20 parts of ethyl acetate, 10 parts of ethyl alcohol and 25 parts of toluene. 5 parts of triacetate of pentanetriol-1-2-5 are added, A varnish of superior quality is thereby obtained. This formula can be modified conveniently to make the varnish more or less stiff, or to pigment it.

Example XIII 10 parts of polyvinyl chloride, molecular weight 150,000 (according to Staudinger) are dissolved in 90 parts of cyclopentanone. 2.5 parts of triacetate of pentanetriol-1-2-5 are added, and this solution is allowed to evaporate upon a thin plate in a ventilated oven. The resultant film is characterized by its pliability and pleasing transparency; whereas, without the triacetate, inflexible and crumpling films result.

Example XIV 30 parts of a mixed polymerization product of polyvinyl chloride and acetate are dissolved in a mixture of 60 parts of acetone and 10 parts of isophorone. To this solution are added 4.5 parts of diacetate of pentanetriol-1-2-5, obtained by partial saponification of triacetate of pentanetriol-1-2-5. (The diacetate is a colorless liquid boiling at 163°–166° C. at 10 mm. pressure, slightly soluble in water.) A varnish solution is thus obtained which can be either used as such or tinted and pigmented in known way. It provides stable and homogeneous films with very good elasticity.

Example XV 5 parts of technical propionate of pentanetriol-1-2-5 are added to 100 parts of a benzene solution containing 25 percent of polystyrol of high viscosity. The resulting solution is a varnish which, after evaporation, produces a flexible coating, and it can be applied to a flexible material; whereas if the propionate of pentanetriol is omitted, the result is a coating that cracks.

Example XVI

The following are intermixed: 100 parts of benzyl cellulose, 20 parts of triacetate of pentanetriol-1-2-5, and 60 parts of solvent (equal volumes of benzene and alcohol). When a paste is obtained, plastic sheets, or moldings, sticks and tubing, are prepared by known methods; these articles are characterized by a good flexibility, and in unpigmented products by an excellent transparency which is particularly better than that obtained by the use of other known plasticizers.

Example XVII 6 parts of triacetate of pentanetriol-1-2-5 are added to 100 parts of an alcoholic solution containing 50 percent of colophony, and the resulting solution is spread upon the surface of a paper band. The solvent is evaporated by drying, and a coated flexible adhesive paper is thereby obtained which is much less brittle than one prepared without pentanetriol triacetate.

Example XVIII 4 grams of propionate of pentanetriol-1-2-5 are added to 100 grams of an aqueous solution containing 20 percent of polyvinyl alcohol, saponification value 120. Upon drying, a non-sticky, flexible, slightly dull film is obtained.

It will be understood by those skilled in the art that statements herein of proportions of ingredients of the compositions exemplified, and statements of temperatures, are susceptible to appropriate modifications without departure from the spirit and scope of this invention.

It will be perceived, from the varied illustrative examples herein presented, that the methods of adaptations and modifications of organic plastifiable materials by means of the herein disclosed adjuvant pentanetriol compounds supply a wide range of products having practical utility in extensive industrial fields.

We claim:

1. A composition of matter consisting of a cellulosic derivative of the class comprising cellulose esters and cellulose ethers plasticized with triacetate of pentanetriol 1,2,5.

2. A composition of matter consisting of cellulose acetate plasticized with triacetate of pentanetriol 1,2,5.

3. A composition of matter consisting of benzyl cellulose plasticized with triacetate of pentanetriol 1,2,5.

4. A composition of matter consisting of nitrocellulose plasticized with triacetate of pentanetriol 1,2,5.

MAXIMILIEN GRUNFELD.
EMILE CLEMENT COTTET.

REFERENCES CITED

The following references are of record in the file of this patent:

UNITED STATES PATENTS

| Number | Name | Date |
| --- | --- | --- |
| 2,100,425 | Bent et al. | Nov. 30, 1937 |
| 2,337,340 | Meyer | Dec. 21, 1943 |